US011820178B2

(12) United States Patent
Pryce et al.

(10) Patent No.: US 11,820,178 B2
(45) Date of Patent: *Nov. 21, 2023

(54) TREAD DEPTH MEASUREMENT

(71) Applicant: SIGMAVISION LTD., Weston-on-the-Green (GB)

(72) Inventors: Andrew Pryce, Weston-on-the-Green (GB); Björn Gustafsson, Weston-on-the-Green (GB); Kshitij Sisodia, Weston-on-the-Green (GB)

(73) Assignee: SNAP-ON EQUIPMENT S.R.L. A UNICO SOCIO, Correggio (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/411,177

(22) Filed: Aug. 25, 2021

(65) Prior Publication Data

US 2021/0379936 A1 Dec. 9, 2021

Related U.S. Application Data

(63) Continuation of application No. 16/096,282, filed as application No. PCT/GB2017/051156 on Apr. 25, 2017, now Pat. No. 11,130,373.

(30) Foreign Application Priority Data

Apr. 25, 2016 (GB) .................................. 1607164

(51) Int. Cl.
*B60C 11/24* (2006.01)
*G01B 11/02* (2006.01)
(Continued)

(52) U.S. Cl.
CPC .......... *B60C 11/246* (2013.01); *G01B 11/026* (2013.01); *G01B 11/22* (2013.01); *G01B 21/18* (2013.01)

(58) Field of Classification Search
CPC ..... B60C 11/246; G01B 11/026; G01B 11/22; G01B 11/2522; G01B 21/18
See application file for complete search history.

(56) References Cited

U.S. PATENT DOCUMENTS 7,269,997 B2 9/2007 Dale, Jr. et al.
8,625,105 B2 1/2014 Pryce et al.
(Continued)

FOREIGN PATENT DOCUMENTS

DE 102008057542 A1 7/2009
DE 102012024545 A1 6/2014
WO 9610727 A1 4/1996

OTHER PUBLICATIONS

Notification of Transmittal of the International Search Report and the Written Opinion of the International Searching Authority (Form PCT/ISA/220), International Search Report (Form PCT/ISA/210), and Written Opinion of the International Searching Authority (PCT/ISA/237) for International Patent Application No. PCT/GB2017/051156, dated Jul. 7, 2017 (14 pages).

(Continued)

*Primary Examiner* — Tri T Ton
(74) *Attorney, Agent, or Firm* — Withrow & Terranova, P.L.L.C.; Vincent K. Gustafson (57) ABSTRACT

A method of generating a three-dimensional topological surface representation of a tyre on a vehicle, the method comprising: using a tread depth measurement device to record tread depth data for a tyre surface moving relative to the tread depth measurement device; generating a movement profile of the tyre surface; and using the movement profile of the tyre surface to map the tread depth data onto a base tyre structure, thereby generating a three-dimensional topological surface representation of the tyre.

22 Claims, 10 Drawing Sheets

(51) Int. Cl.
    *G01B 11/22*     (2006.01)
    *G01B 21/18*     (2006.01)

(56)                  References Cited

U.S. PATENT DOCUMENTS

| | | | |
|---|---|---|---|
| 9,296,263 B2* | 3/2016 | Muthukumar | B60T 1/10 |
| 11,130,373 B2* | 9/2021 | Pryce | G01B 11/22 |
| 2012/0008148 A1 | 1/2012 | Pryce et al. | |
| 2013/0266225 A1* | 10/2013 | Vinciguerra | G06T 3/0056 |
| | | | 382/190 |
| 2014/0232852 A1* | 8/2014 | Nobis | G01B 11/2522 |
| | | | 348/128 |
| 2016/0069779 A1* | 3/2016 | Uffenkamp | G01B 11/25 |
| | | | 356/601 |
| 2018/0189939 A1* | 7/2018 | Ghidotti Piovan | G06T 7/136 |
| 2020/0062042 A1 | 2/2020 | Pryce et al. | |

OTHER PUBLICATIONS

Final Office Action for U.S. Appl. No. 16/096,282, dated Dec. 15, 2020, 9 pages.
Notice of Allowance for U.S. Appl. No. 16/096,282, dated Mar. 17, 2021, 7 pages.
Notice of Allowance for U.S. Appl. No. 16/096,282, dated May 26, 2021, 11 pages.
Examination Report for European Patent Application No. 17721802. 1, dated Aug. 19, 2019, 4 pages.
Extended European Search Report for European Patent Application No. 20167295.3, dated Oct. 7, 2020, 7 pages.
Office Action for U.S. Appl. No. 16/096,282, dated May 29, 2020, 11 pages.

\* cited by examiner

TREAD DEPTH MEASUREMENT

CROSS-REFERENCE TO RELATED APPLICATIONS

This application is a continuation of U.S. patent application Ser. No. 16/096,282 filed on Oct. 24, 2018, and subsequently issued as U.S. Pat. No. 11,130,373 on Sep. 28 2021, which is a 35 U.S.C. § 371 national phase filing of International Application No. PCT/GB2017/051156 filed on Apr. 25, 2017, and claims the benefit of United Kingdom Patent Application No. 1607164.9, filed on Apr. 25, 2016, wherein the disclosures of the foregoing applications and patent are hereby incorporated by reference herein in their respective entireties.

TECHNICAL FIELD

The invention relates to assessment of vehicle tyre tread, and particularly but not exclusively to three dimensional imaging of vehicle tyre treads to obtain tread depth information.

BACKGROUND

Tyres for road-going vehicles are typically provided with a pattern of grooves, known as tread, for displacing water from between the tyre and the road surface in order to improve traction in wet conditions. National laws typically prescribe minimum tread depths for the tyres of road-going vehicles for safety reasons. It is therefore important to be able to inspect a tyre tread to ensure that the tread has not become unsafe or illegal due to wear on the tread.

As purchasing and fitting replacement tyres can form a significant part of the total cost of running a vehicle, premature replacement can be regarded as wasteful. This is especially true for fleet operators, such as a bus and haulage company, who have large numbers of tyres to replace each year. Conversely, continuing to use tyres that do not satisfy legal or commercial minimum tread requirements may be illegal and can compromise vehicle safety. Thus, the Applicant has identified a need for a system for easily monitoring the wear of a tyre, e.g. to determine how soon the tyre will need replacing, or to identify any other flaws that may be unsafe.

A tyre's tread may be scanned in a number of different ways to measure the tyre wear and tread depth. For example, optical scanning devices incorporated in drive-over ramps, rolling roads or handheld scanners may be used. However, conventional methods of using this kind of apparatus only obtain a depth measurement corresponding to a line across the tyre surface (referred to as a "two dimensional" measurement, where the first dimension corresponds to the depth of the tread and the second dimension corresponds to the length of the line). These known methods are therefore potentially unreliable as they provide incomplete information regarding the quality of a tyre's tread. For example, if there is a portion of the tyre that is badly worn, this could be very easily missed if the line or lines that are scanned fall outside the worn area. Similarly, if foreign bodies, such as dirt, debris or water droplets, are present in the tread grooves where the laser line intersects the tyre, then the resulting tread depth measurements would be inaccurate.

SUMMARY

According to the invention there is provided a method of generating a three-dimensional topological surface representation of a tyre on a vehicle, the method comprising:

using a tread depth measurement device to record tread depth data for a tyre surface moving relative to the tread depth measurement device;
generating a movement profile of the tyre surface; and
using the movement profile of the tyre surface to map the tread depth data onto a base tyre structure, thereby generating a three-dimensional topological surface representation of the tyre.

The invention thus provides a method for mapping tread depth information onto a base tyre structure (e.g. having curvature corresponding to the curvature of the tyre), thereby to create a three dimensional topological surface representation of the entire tyre surface (where tread depth data for the entire tyre is obtained) or of a part of the tyre surface (e.g. where tread depth data for a segment of the tyre is obtained).

The base tyre structure may be based on any non-linear equation that is an approximation to the shape of a tyre, or the shape of part of a tyre. For example, the base tyre structure could be based on an equation of an ellipse or an equation of a circle if a large part of the circumference has been measured. An equation of an ellipse may be used for a tyre that is deformed due to the weight of the vehicle, e.g. under strain. If deformation is negligible or not present, the equation of a circle may be used. An equation of a parabola may be used if a small segment of the tyre has been measured.

The method of the invention can, at least in preferred embodiments thereof, provide more complete information that can be more easily assessed to determine tread quality. The tread depth measurement device may be able to obtain tread depth data for portions covering all or a segment of the tyre.

The tread depth measurement device may be arranged to measure tread depth using any suitable method. For example, the device may comprise a tactile sensor (e.g. a series of fine fingers), an x-ray sensor, a capacitive sensor, etc. However, in a set of embodiments, the device comprises an optical sensor. For example, the device may comprise one or more lasers to direct a pattern, e.g. a line, onto the tyre surface, and one or more cameras arranged to image the resulting laser pattern on the tyre surface. The tread depth measurement device may comprise a laser triangulation sensor comprising a laser source and a 2D digital imager. As another example, the measurement sensor may comprise stereoscopic cameras with two 2D digital imagers and an LED or other light source in the visible spectrum.

In a set of embodiments, the method comprises recording tread depth data as the tyre turns, preferably at a constant rate, relative to the tread depth measurement device while the vehicle is stationary. For example, this may be achieved while the vehicle is on a rolling road. In such embodiments, the movement profile may be determined simply from the rotation speed of the tyre which allows tread depth measurement data that is obtained from the tyre surface to be mapped in a straightforward manner to a base tyre structure by relating the time at which the tread depth data was recorded to a corresponding position on the base tyre structure.

In another set of embodiments, the tread depth data is obtained using a handheld device, e.g. which may be rolled across or around the surface of the tyre. In a set of such embodiments the device is adapted to generate a movement profile by measuring its own movement relative to the tyre, e.g. using a rotary encoder or the like. This also allows the movement profile to be obtained in a straightforward manner. In such embodiments, the handheld scanning device could further comprise an accelerometer. Feedback from the accelerometer may then be used to determine the curvature of the tyre, which may be used in generating the base tyre structure.

In a set of embodiments however, the method comprises recording the tread depth data as the vehicle moves towards or away from the tread depth measurement device. For example, the tread depth data may be recorded as the vehicle moves towards or away from a drive-over ramp, or as it rolls up onto the ramp or down off of the ramp. Some of the tread depth data could be obtained as the tyre rolls over the top of a drive-over ramp, e.g. from a portion of the tyre that contacts the ramp. However, typically the tread is squashed in the region contacting the ramp, and so any tread depth measurement performed in the contact region tends to be reduced, so this approach is not preferred.

When the distance between the tyre and the measurement device changes while the measurement is being taken, obtaining the movement profile can be more complex. In such embodiments the distance could be determined using a separate sensing system, many examples of which are known, per se, in the art such as ultrasonic or laser range finders, radar Doppler detectors or the like. In a set of embodiments however the tread depth measurement device is arranged to use a sensing arrangement both for determining a distance to the tyre surface and for measuring tread depth.

Thus in some embodiments, the movement profile comprises or is derived from a set of data representing the positions at given times traced by a part of the tyre surface as the tyre is moving—referred to hereinafter as a "trace". It will be appreciated that the part of the tyre surface which is traced will not refer to a fixed physical point (e.g. a particular patch of tyre tread) as it rotates around the tyre, but rather it refers to a location on the surface of the tyre relative to the vehicle body, disregarding rotation. For example, the relevant part of the tyre surface may be the forward-most or rearward-most point on the tyre relative to the direction of motion of the vehicle at any given time, or it may be the part of the tyre surface that is closest to the tread depth measurement device. As an example, for a vehicle moving towards a drive-over ramp at constant speed, the distance of a given part of the tyre from the measurement device will be a linearly decreasing plot.

There are numerous environmental factors that can interfere with the acquisition of a complete and accurate movement profile. There are also aspects of the tyre structure that can prevent an accurate and complete movement profile, e.g. a complete trace, being obtained. For example, as the tyre rotates while the trace is being acquired, the position being traced may coincide with a region of the tyre corresponding to tyre features such as tread grooves, sipes or a tyre shoulder. The distance to the tyre recorded at this point may be inaccurate or may contain discontinuities due to the presence of the groove, sipe or tyre shoulder. In a set of embodiments, the method comprises discarding portions of the trace corresponding to tread grooves, sipes and/or tyre shoulders.

Any dirt, debris or water on the tyre tread surface may also cause discontinuities in the trace and may also introduce noise. Accordingly, in some embodiments, the method comprises filtering noise from the trace. The method may also comprise smoothing the trace, e.g. to smooth out discontinuities therein.

As mentioned above, some portions of the trace may be disregarded or otherwise missing as a result of dirt, debris, tyre features, etc. In some embodiments, the method comprises using spline interpolation to remove discontinuities in the trace. For example, where a portion of the trace is missing, spline interpolation may enable the gap to be filled with an approximation of the shape that the trace that would have had if the dirt/feature had not been present to cause the discontinuity. It is thereby possible to obtain a more complete trace (and thus a more complete movement profile) allowing a better, e.g. more reliable and more complete, three-dimensional topological surface representation of the tyre to be obtained.

In some embodiments, the method comprises obtaining a plurality of traces, each corresponding to a respective position on the tyre surface. Each of the plurality of traces may be obtained in the same way as described above. It will be appreciated that this may help to provide a more reliable or more accurate movement profile. For example, the plurality of traces may be combined (e.g. averaged, as described below) to obtain a single trace that is used as the movement profile.

The method may comprise extrapolating one or more traces corresponding to respective positions on the tyre surface to extend said one or more trace to the same length as a further trace corresponding to a further position on the tyre surface. For example, there may be one trace in the plurality of traces that is longer than the other traces, and the other trace may be extrapolated to extend them to the longer length. It will be appreciated that there may be a trace that extends beyond the other traces at one end, but which is shorter than one or more other traces at the other end. In that case, all the traces may be extended by extrapolation at at least one end so that all the traces are the same length. It will be appreciated that by extrapolating the traces so that they are all the same length, the traces can be combined or compared to obtain a single movement profile corresponding to the full length of the traces. It will be appreciated that being "the same length" may mean that the traces (expressed as distance as a function of time) extend over the same range of time values, i.e. they all start at the same time value and all end at the same time value.

The method may comprise discarding any trace that shows more than a defined variation from the median of the other traces of the plurality of traces. This may help to eliminate contributions to the movement profile from a trace resulting from an unreliable measurement. For example, if a trace corresponds to a point on the tyre close to the edge, e.g. close to the tyre shoulder, it may not be as reliable for determining a movement profile. This step of the method allows such traces to be removed. It will be appreciated that a different criterion for discarding a trace could be used from this step, e.g. variation from a mean or other average of the plurality of traces.

The method may comprise taking the average of the plurality of traces to obtain a movement profile comprising a single trace. Combining the plurality of traces to obtain a single trace may provide a more reliable or more accurate movement profile, e.g. by reducing the effect of any random errors in the traces.

It will be appreciated that where more than one of the steps described above relating to discarding data corresponding to features such as tread grooves, sipes and shoulders; filtering noise; smoothing a trace or traces; spline interpolation; and discarding traces deviating substantially from the median is carried out, they may be carried out in a different order from the order they are mentioned above. One or more of the steps may be omitted, and/or additional method steps may be included between these steps. However, in a set of embodiments the method comprises carrying out these steps in the order given above prior to calculating an average of the traces.

However it is obtained—either directly from measurement of the relative rotation between the tyre and depth measurement device at a fixed mutual spacing (such as in the rolling road and hand-held device examples above), or by the more complex methods described when the vehicle is travelling towards or away from the sensor—once the movement profile has been obtained, the tread depth data recorded by the tread depth measurement device can then be mapped on to the base tyre structure using the movement profile to relate the time at which the tread depth data of a portion of the tyre was recorded to a corresponding position on the base tyre structure to generate the three dimensional topological surface representation.

In a set of embodiments, said mapping is based on a frame rate of the measurement device. For example the movement profile may be used to determine the appropriate part of the base tyre structure to map the data recorded for each frame.

The method may comprise correcting for an angle of a scan relative to the tyre axis (i.e. the tyre's axis of rotation). For example, where a handheld device is used to scan the surface of the tyre, if the handheld device is rolled in a direction that is not exactly in line with the tyre axis, or not exactly following the tyre circumference, the tread depth data obtained may correspond to a region of the tyre that is skewed relative to the tyre axis. Correcting for the skew of the scan relative to the tyre axis may comprise using an algorithm which identifies the edges of a scanned region to identify data characteristic of the sidewalls of the tyre (e.g. data dropout corresponding to the sidewalls). This may then be corrected using a trigonometric rotation function.

In some embodiments, the generated three-dimensional topological surface representation may be improved using a combination of spatial low pass filters and/or a bilateral filter for preserving the edges of the tyre. The spatial low pass filters and/or bilateral filter may be applied after the three-dimensional topological surface representation has been generated, for example, to improve the aesthetic appearance of the representation. For example, the spatial low pass filters and/or bilateral filter may remove any residual noise.

BRIEF DESCRIPTION OF DRAWINGS

Certain embodiments of the invention will now be described, by way of example only, with reference to the accompanying drawings, in which.

DETAILED DESCRIPTION

Figure 1:
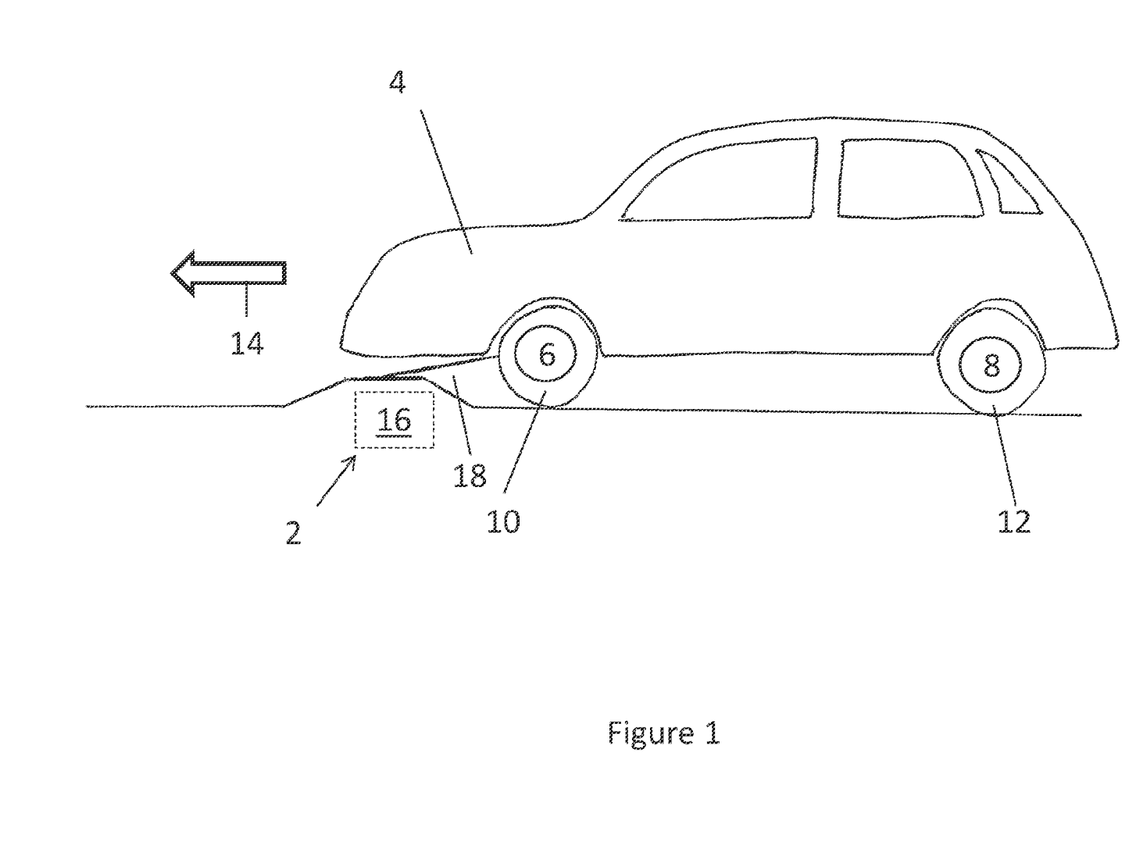
FIG. 1 shows a vehicle approaching a drive-over ramp tread depth measurement apparatus in accordance with an embodiment of the invention.

FIG. 1 shows a drive-over ramp 2 for obtaining a three dimensional topological surface representation of a tyre in accordance with the present invention. FIG. 1 shows a vehicle 4 with a front wheel 6 and a rear wheel 8 having respective tyres 10 and 12. The vehicle 4 is moving towards the ramp 2 in direction of arrow 14. The drive-over ramp 2 contains a tread depth measurement apparatus 16 which emits a laser beam 18 to project a pattern of light onto the front tyre 10.

Figure 2:
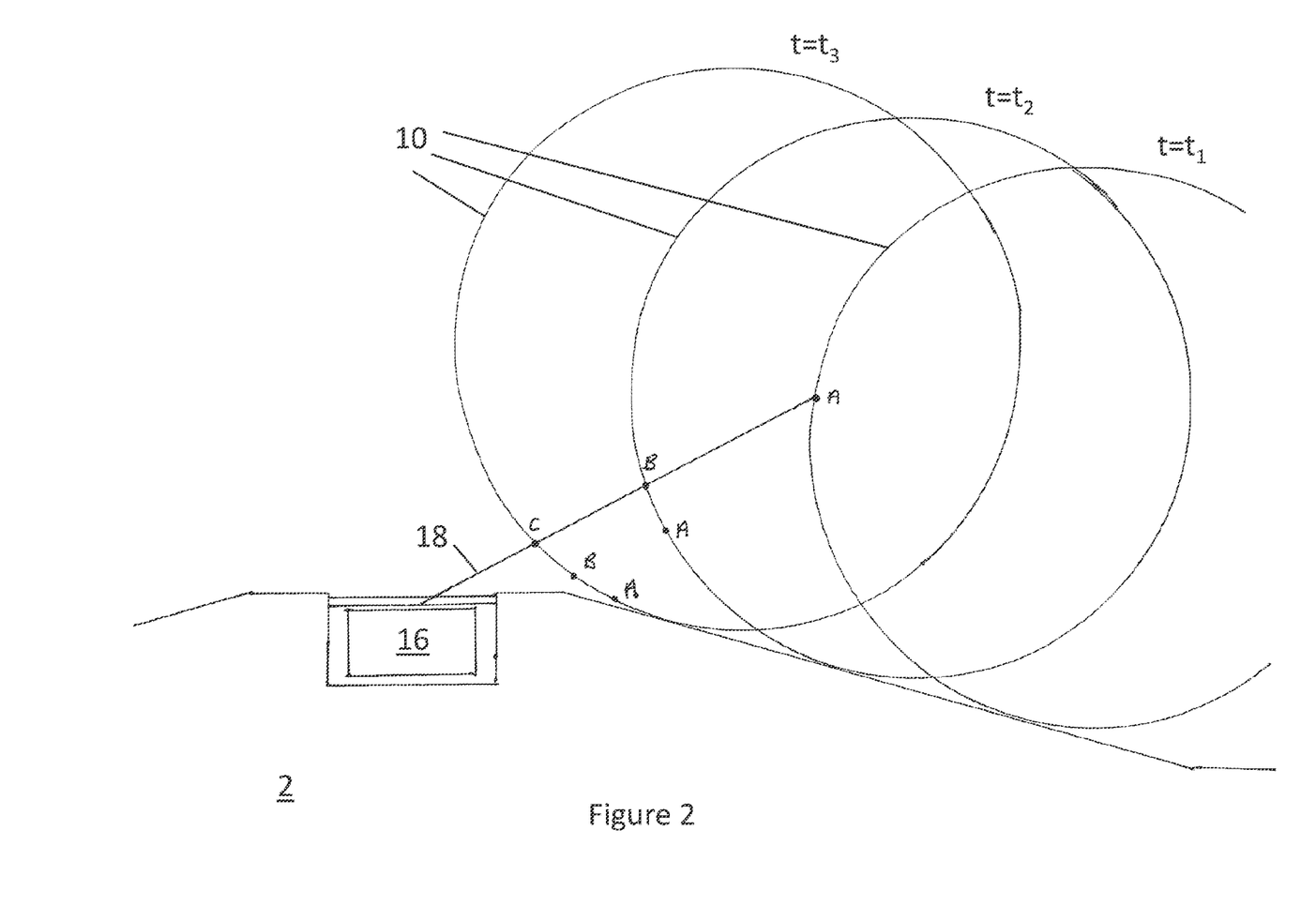
FIG. 2 shows a schematic close up view of the tyre on the vehicle of FIG. 1 as the vehicle drives over the ramp.

FIG. 2 shows a close up view of the drive-over ramp 2 and front tyre 10 as the vehicle 4 drives over the ramp 2. For clarity, only the outline of the front tyre 10 is shown. FIG. 2 shows the position of the front tyre at three different times. The earliest time is $t_1$, followed by $t_2$, and the latest time is $t_3$. At time $t_1$, the laser beam 18 is projected onto a region A of the tyre 10.

At the later time $t_2$, the front tyre 10 has rolled forward closer to the top of the ramp 2. As the tyre rolls, it rotates about its axis so that the region A is now lower than the point at which the laser beam 18 is now incident on the tyre 10. Instead, a new region of the tyre surface B has rotated into line with the laser beam 18. Region B is therefore illuminated. At the later time $t_3$, the tyre has rolled forward further, and a new region C has come into line with the laser beam 18. Region C is therefore illuminated by the laser beam 18 at $t_3$.

Figure 3:
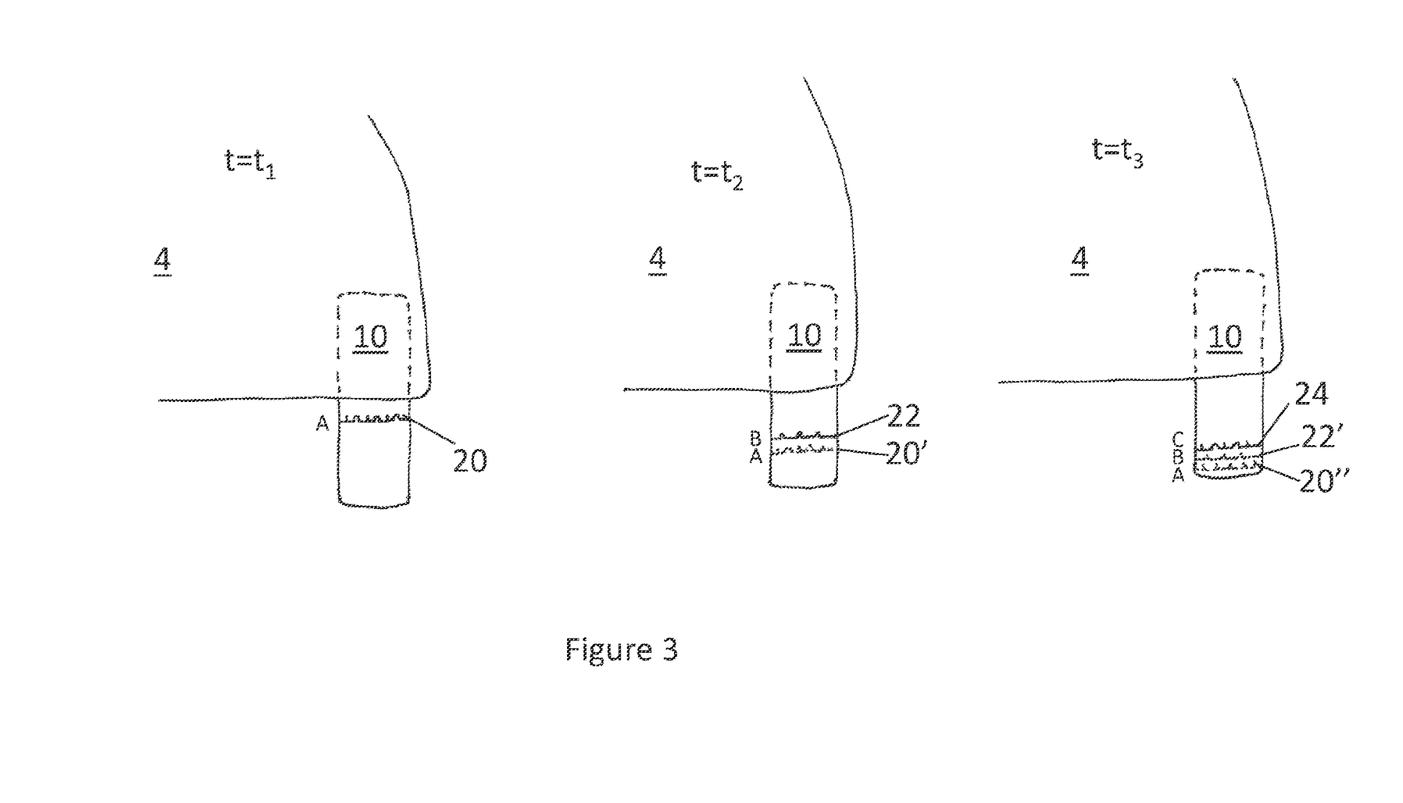
FIG. 3 shows a front view of the tyre of the vehicle of FIGS. 1 and 2 at three different times, showing a light pattern projected on to the tyre by the tread depth measurement apparatus.

In the embodiment shown, the laser beam 18 has the shape of a sheet of light so that the pattern projected by the laser beam 18 is an elongate pattern. This is shown in FIG. 3, which shows a front view of the tyre at times $t_1$ (left), $t_2$ (centre) and $t_3$ (right). At $t_1$, the laser beam 18 projects an elongate pattern 20 at position A on the tyre. A camera (not shown) contained in the tread depth measurement apparatus 16 is directed at the tyre surface to image the area of the tyre surface on which the light pattern 20 is projected. The light pattern 20 projected by the laser beam 18 is a straight line, but when it falls on the tyre, some portions of the lines fall in grooves, sipes and other tyre features. The camera is positioned so that it does not view the tyre at 90° to the tyre surface, but at an angle to the surface normal (e.g. around 45°). As a result, when the pattern is imaged by the camera, the pattern appears as a deformed line, as regions of the light pattern 20 that fall in grooves, sipes, etc. appear laterally displaced due to the camera viewing angle. The extent of the lateral displacement can then be used to infer the tread depth for region A.

At time $t_2$, the vehicle is closer to the ramp, and the wheel 10 has rotated so that a new region of the tyre B is illuminated by the laser beam 18. This is shown as an elongate pattern 22. The position of region A which was previously illuminated is shown by dotted line 20'. The camera images the pattern 22 to obtain tread depth data for region B.

At time $t_3$, the wheel has rotated further and a new region C is illuminated by the laser beam 18. This is shown as an elongate pattern 24. The positions of regions B and A are shown respectively as 22' and 20''. The camera images the pattern 24 to obtain tread depth data for region C.

Thus it can be seen that as the vehicle 4 approaches the ramp 2, different regions of the tyre tread come into view of the tread depth measurement apparatus 16. It will be appreciated that only a few example times $t_1$, $t_2$ and $t_3$ have been shown. However, in accordance with the invention, the tread depth apparatus may image regions corresponding to many more times so as to create a high resolution three-dimensional topological surface representation. For example, the number of line scans (i.e. the number of two-dimensional regions) imaged may be of the order of 1000. The number of data points in each line that is imaged may be in the region of a few hundred, e.g. 300 or 400 data points. The three-dimensional topological surface representation may therefore contain hundreds of thousands of data points, e.g. around 300,000 data points. However, it will be appreciated that the three-dimensional topological surface representation may contain more or fewer data points than this. For example, in embodiments requiring a faster can speed, fewer data points may be recorded in order to obtain and process the thread depth data more quickly.

Referring again to FIG. 2, as can be seen from the sequential times $t_1$, $t_2$ and $t_3$, as the vehicle approaches and drives over the ramp, the distance from the tread depth apparatus 16 to the point at which the laser beam 18 impinges on the tyre surface varies as the tyre 10 approaches the ramp 2. The distance between the tread depth apparatus 16 and the tyre surface is inferred to obtain a distance estimate for each region (A, B, C, etc.) that is imaged.

The distance is inferred using the position in the image captured by the camera of the portion of the tyre illuminated by the laser. Thus, with reference again to FIG. 3, it can be seen that the pattern 20 will be further towards the top of the image captured by the camera, whereas the pattern 22 will be slightly lower and the third pattern 24 lower still as a result of the tyre 10 advancing. The analysis software uses a look-up table to relate the change in position of the patterns 20, 22, 24 across the imaging field to a distance (since the change is non-linear). Although theoretically the relationship in the look-up table is dependent on the diameter of the tyre, the Applicant has found that for a given type of vehicle (car, bus, truck etc.) the effect is very small and can be ignored.

Figure 4:
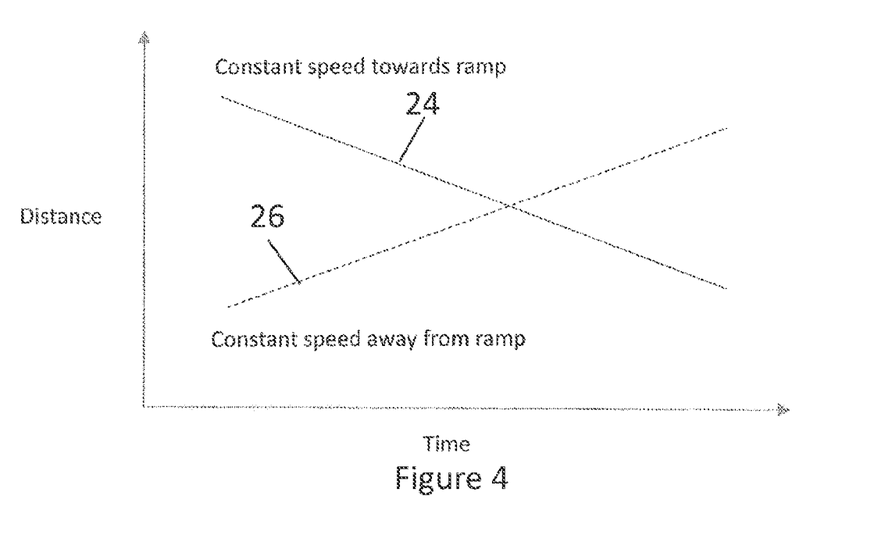
FIG. 4 shows a movement profile for a vehicle moving at constant speed towards the ramp and a movement profile for a vehicle moving at constant speed away from the ramp for the embodiment shown in FIGS. 1 to 3.

FIG. 4 is a distance-time graph showing movement profiles 25, 26 for two tyres on respective vehicles undergoing different motion. Each movement profile 25, 26 comprises an idealised trace of the position of part of the respective tyre. The distance plotted on the y-axis is, for example, the distance between the tread depth measurement apparatus in the ramp and the closest part of the tyre surface. The linearly decreasing movement profile 25 is a movement profile for a vehicle moving towards the ramp 2 with constant speed. The other movement profile 26, which is linearly increasing, is for a vehicle moving at constant speed away from the ramp. It will be appreciated that the ramp 2 depicted in FIGS. 1 and 2 can also be configured to project a laser pattern onto the rear tyre 12 of the vehicle 4 as the vehicle 4 moves away from the ramp 2. As mentioned above, the movement profile comprises idealised traces, but it will be appreciated that in practice a vehicle will typically not move with exactly constant speed towards or away from the ramp, i.e. actual measured traces will not be perfectly linear.

Figure 5:
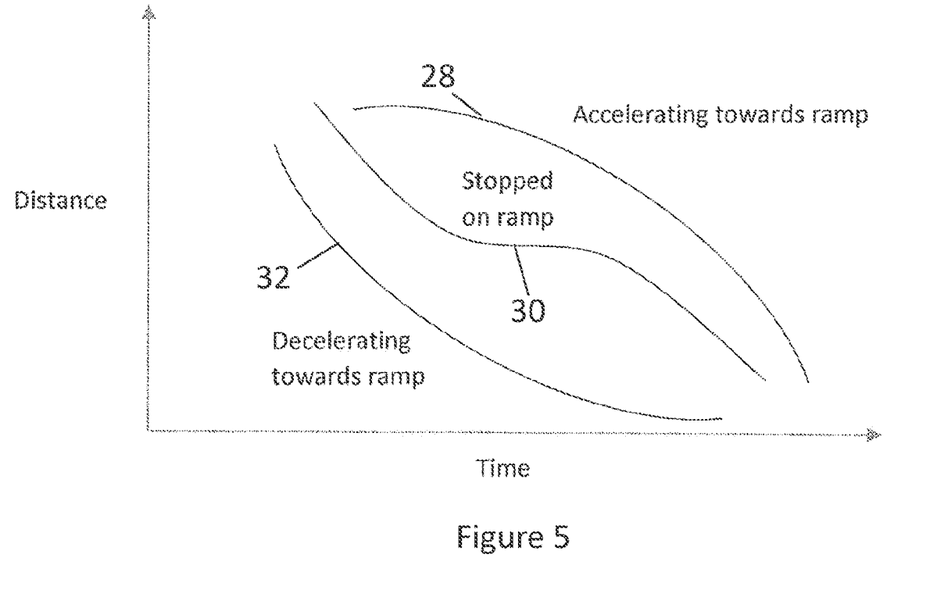
FIG. 5 shows three movement profiles corresponding to a vehicle accelerating towards the ramp, a vehicle stopping on the ramp and a vehicle decelerating towards the ramp.

FIG. 5 shows the other possible movement profiles 28, 30, 32, each comprising an idealised trace. Movement profile 28 relates to a vehicle 4 accelerating towards the ramp 2. Movement profile 30 is for a vehicle 4 moving towards/up the ramp 2, stopping on the ramp 2, and continuing to move towards/up the ramp 2. Movement profile 32 is for a vehicle 4 decelerating as it approaches the ramp 2.

In practice, it may not be possible to obtain a complete and sufficiently accurate movement profile directly from a single measurement of the distance to the tyre surface, e.g. from a single trace obtained. As mentioned above, due to the presence of tyre features, such as grooves, sipes and tyre shoulders, there may be regions of a recorded trace which are missing, noisy, or otherwise inaccurate or unreliable. Accordingly, regions corresponding to grooves, sipes, etc., or dirt/debris may be removed.

Figure 6:
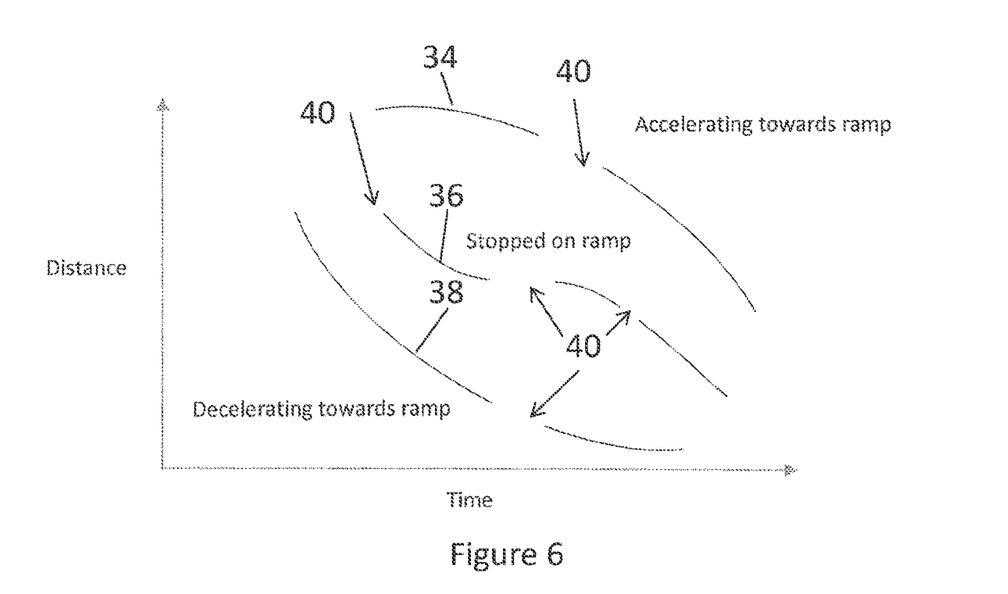
FIG. 6 shows example traces corresponding to a part of the tyre as the vehicle of FIG. 1 approaches the ramp, showing gaps in the traces arising from removal of data corresponding to tyre features and dirt on the tyre.

FIG. 6 shows three exemplary traces 34, 36, 38 that might be recorded in practice for a vehicle or vehicles undergoing the same movement represented by the idealised movement profiles 28, 30, 32 shown in FIG. 5. The traces 34, 36, 38 shown in FIG. 6 have had portions corresponding to tyre features (e.g. grooves, sipes, tyre shoulders) and dirt or debris removed to leave gaps 40.

Figure 7:
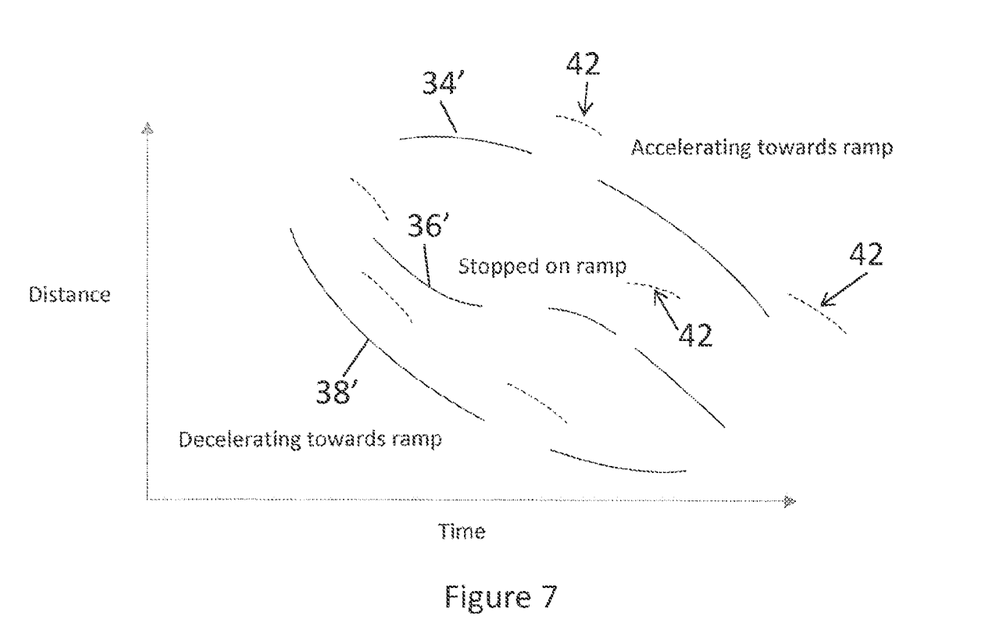
FIG. 7 shows the traces of FIG. 6, indicating where noise occurs as a result of dirt or debris on the tyre.

FIG. 7 shows three traces 34', 36' and 38' representing the situation in which the recorded traces exhibit noise 42 resulting from dirt or debris on the tyre surface. When the traces are processed to obtain the movement profile, the noise 42 is removed from the data, e.g. to arrive at the traces 34, 36, 38 as shown in FIG. 6 (i.e. without noise).

It will be appreciated that the example traces shown in FIGS. 6 and 7 represent three possible different movement profiles. In practice, the analysis will be carried out one movement profile, corresponding to the actual movement of the vehicle 4.

FIGS. 8-12 show an example of how a plurality of traces obtained for the vehicle 4 moving towards the drive-over ramp 2 may be processed to obtain a movement profile. These could be obtained, for example, by dividing up the image of the laser light pattern laterally into five sections (for example, using a transmission grating beam splitter) and carrying out independent analysis (for the purpose of establishing the movement traces) representing each of the five sections.

Figure 8:
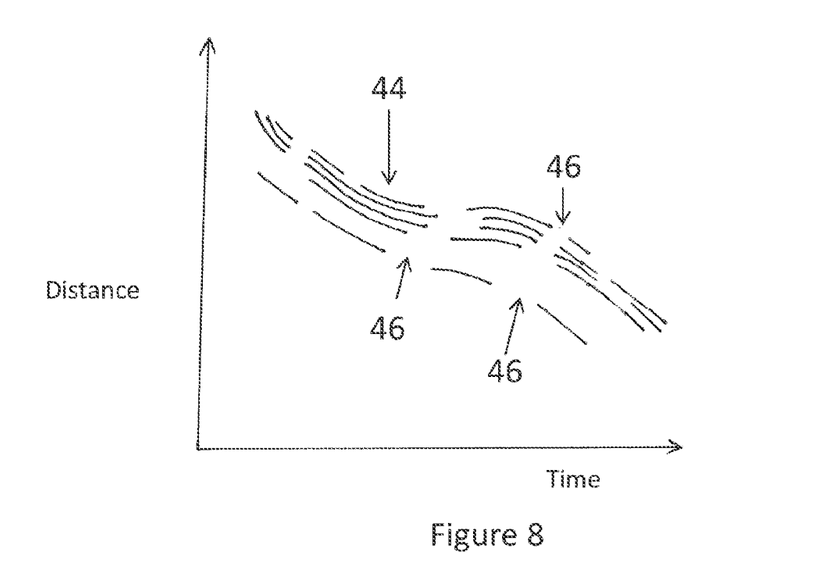
FIG. 8 shows an example plurality of traces obtained for a number of parts of the tyre as the vehicle of FIG. 1 approaches the ramp.

FIG. 8 shows a plurality of traces 44 corresponding to the vehicle 4 moving towards a ramp 2, stopping on the ramp 2, and then continuing to drive over the ramp 2. Each of the traces 44 corresponds to a different lateral part of the tyre surface as mentioned above. Each trace contains gaps 46 corresponding to regions that have been removed because they correspond to tyre features or dirt/debris as discussed above with reference to FIGS. 6 and 7. Noise has also been removed as discussed above with reference to FIG. 7.

Figure 9:
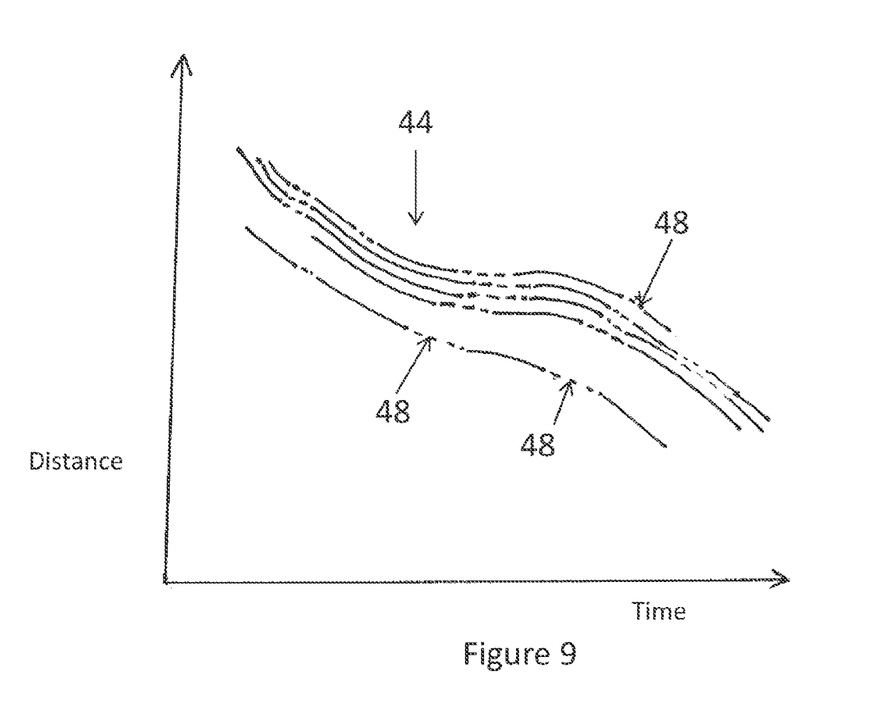
FIG. 9 shows the traces of FIG. 8, indicating where spline interpolation is used to complete gaps arising from data that is disregarded.

The first stage of processing after the removal of noise is shown in FIG. 9. This stage involves using spline interpolation to join the gaps 46 resulting from the removal of noise. The regions added by spline interpolation are shown by dotted lines 48. It will be noted that the traces 44 shown in FIG. 9 are not all of the same length.

Figure 10:
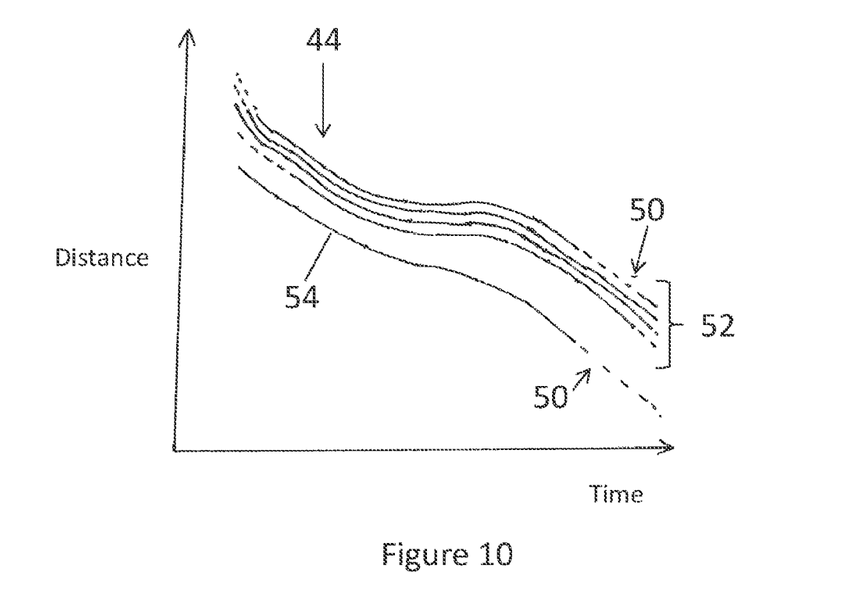
FIG. 10 shows the traces of FIG. 9, showing extrapolation of the ends of the traces to make them the same length.

FIG. 10 shows the next stage of processing, which is to extrapolate the ends of the traces 44 so that they are all the same length. The regions added to the traces by extrapolation are shown by dotted lines 50.

As mentioned above, a plurality of traces were obtained, each corresponding to a different position on the tyre surface. The example described with reference to FIGS. 8-12 uses five traces but it will be appreciated that a different number of traces may be used. In particular, a much larger number of traces could be used if desired. Only five are shown in this example for clarity. The advantage of measuring traces for a plurality of sections across the tyre surface is that an average can be taken to provide a more reliable movement profile, e.g. to reduce the effect of random errors.

Figure 11:
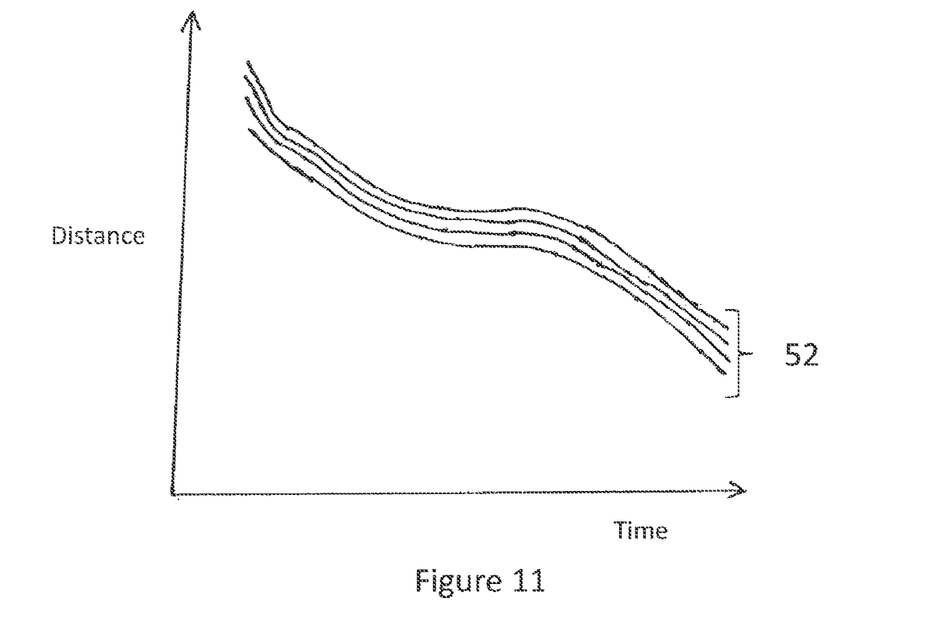
FIG. 11 shows the traces of FIG. 10, with one of the traces disregarded due to substantial variation from the median trace.
Figure 12:
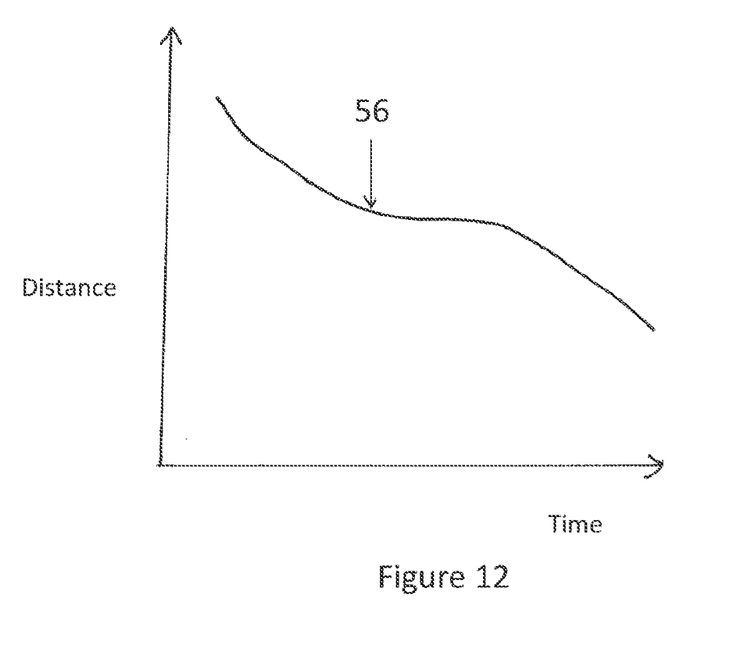
FIG. 12 shows a movement profile corresponding to an average of the traces shown in FIG. 11.

It can be seen from FIG. 10 that four of the traces 52 are close together while one traces 54 deviates from the median of the other four. FIG. 11 shows the plurality of traces with the deviating trace 54 removed in recognition that a trace that deviates substantially from the median is likely to be erroneous, e.g. it may correspond to a region very close to the tyre sidewall. The remaining traces 52 are then averaged to obtain a movement profile. The movement profile 56 resulting from taking the average is shown in FIG. 12.

Figure 13:
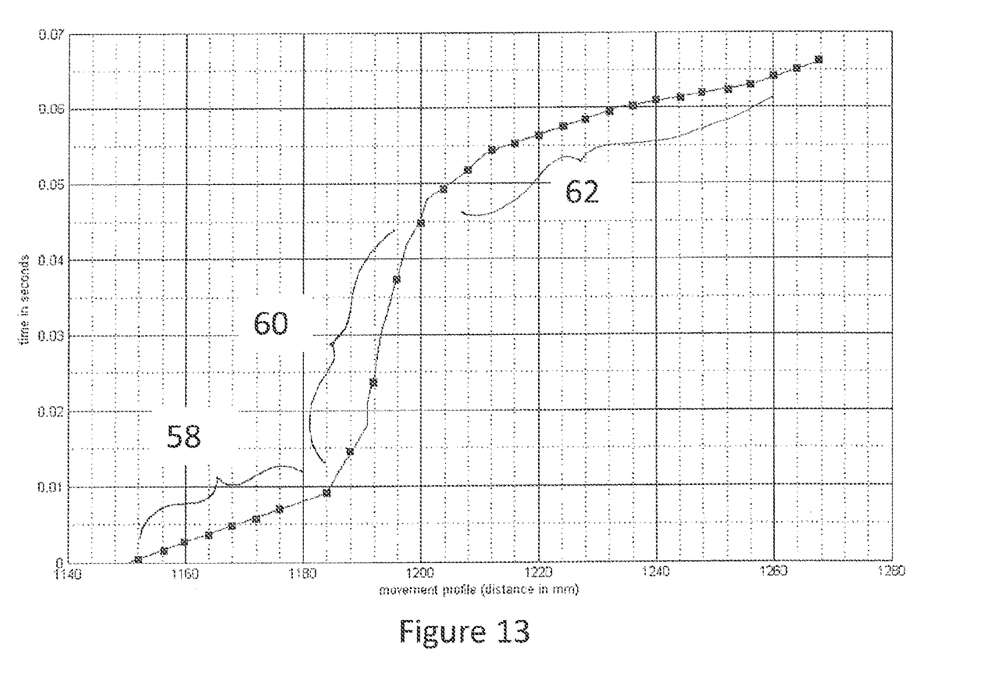
FIG. 13 shows recorded distance data representing a movement profile for a tyre moving away from a ramp.

FIG. 13 shows a movement profile calculated from recorded data for a vehicle moving away from a ramp. It should be noted that this has distance along the horizontal axis and time along the vertical axis. In the initial region 58 the vehicle is starting to move away from the ramp. In the next region 60 the vehicle slows down as it moves towards the end of the ramp, and in the subsequent region 62, the vehicle speeds up again as it continues to move away from the ramp.

Figure 14:
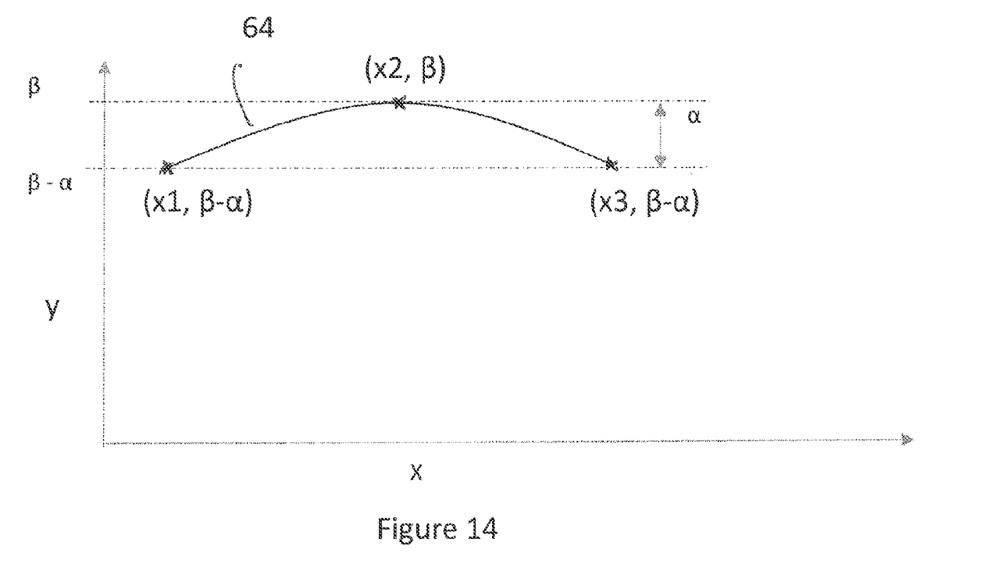
FIG. 14 shows a portion of a curve representing an idealised tyre base structure for a segment of a tyre.

FIG. 14 shows a section of a curve 64 used to map the recorded tread depth data onto a base tyre structure. As mentioned above, for a small segment of the tyre (e.g. 2 inches to 4 inches, or 5 cm to 10 cm), the curvature of the tyre surface can be approximated using a parabola. The curve 64 shown in FIG. 14 is a parabola with the quadratic equation $ax^2+bx+c=y$.

To determine the equation of this idealised curve so that it can be used for a base tyre structure, coefficients a, b and c must be calculated.

If data for a larger portion of the tyre or for the whole tyre have been obtained (e.g. for a stationary vehicle on a rolling road), the same process can be followed by using an ellipse or a circle, which has the following general equation (with a=b for a circle):

$$\frac{(x-h)^2}{a^2} + \frac{(y-k)^2}{b^2} = 1$$

It has been found that an ellipse may give a better approximation to the curvature of the tyre surface.

FIG. 14 shows parameters $\alpha$ and $\beta$. The parameter $\beta$ corresponds to y-value of the maximum of the parabola, and may be expressed in terms of the movement profile distance (i.e. taking the zero of the y axis to be at the position of the tread depth measurement device). The value of $\beta$ can be selected as any convenient point from the movement profile. The value of $\alpha$ can be selected based on how much of the tyre circumference has been captured in order to obtain the desired amount of curvature in the final three-dimensional representation. A larger value of $\alpha$ gives a greater curvature in the parabola, so a small value of $\alpha$ may be used if a small portion of the tyre circumference has been imaged, while a larger value of $\alpha$ may be used if a larger portion has been imaged, e.g. for 2 inches (5 cm), the value of $\alpha$ might be chosen to be $a_1$ mm, and for 3 inches (7.7 cm) it can be chosen to be a different value $a_2$ mm, where $a_2 > a_1$. The value for a may be chosen based on a linear relationship with the length of the tyre circumference region imaged, e.g. it may be calculated using an equation $\alpha = kc$ where c is the length of the tyre circumference region measured, and k is a constant.

To obtain the equation of a parabola corresponding to a base tyre structure for the tyre being measured, numerical values for a, b and c are calculated. Three points on the curve, corresponding to x values x1, x2 and x3 (shown in FIG. 14), are selected to provide three equations that can be solved to obtain a, b, c for the selected values of $\alpha$ and $\beta$:

$$ax1^2+bx1+c=\beta-\alpha$$

$$ax2^2+bx2+c=\beta$$

$$ax3^2+bx3+c=\beta-\alpha$$

Solving for a, b and c gives the result:

$$a = -\frac{\alpha}{(x3-x2)(x2-x1)}$$

$$b = \frac{\alpha(x1+x3)}{(x3-x2)(x2-x1)}$$

$$c = \beta - \alpha\left[1 + \frac{x1 \cdot x3}{(x3-x2)(x2-x1)}\right]$$

The values obtain for a, b and c provide the equation of the parabola that can be used as an ideal curve representing a base tyre structure undergoing movement according to the movement profile.

In physical terms, x1, x2 and x3 are the distances between the laser and the tyre surface at particular times, e.g. t1, t2 and t3 as shown in FIG. 2. The relationship distance x3-x1 (i.e. the distance that the tyre has moved closer to the laser) and the length of the tyre region that is imaged (the distance around the circumference from A to C) is non-linear. In general, there will exist points x1 and x3 for which the distance x3–x1 is approximately twice the distance from A to C around the circumference. To simplify the calculations and mapping process, these values of x1 and x3 may be chosen. The value of x2 can be conveniently chosen as the mid-point between x1 and x3 (which, for small segments, corresponds approximately to the position of B).

The values of x1 and x3 may be conveniently chosen to be the start and end points of the movement profile.

Let this ideal curve be a function of distance in x direction, I(x), and let the movement profile be expressed as M(x). Another function Mp(x) can be generated according to Mp(x)=S1.I(x)–S2.M(x). S1 and S2 are scalars that are used to ensure that the movement profile M(x) and the ideal curve I(x) are scaled to the same physical dimensions. Mp(x) represents the ideal shape of the tyre with the effect of the tyre movement removed. Tread depth data for each point sampled is then mapped onto the function Mp(x) to obtain the three-dimensional topological surface representation of the tyre. For an ellipse, every point x would have two corresponding points on the y axis to be mapped.

Figure 15:
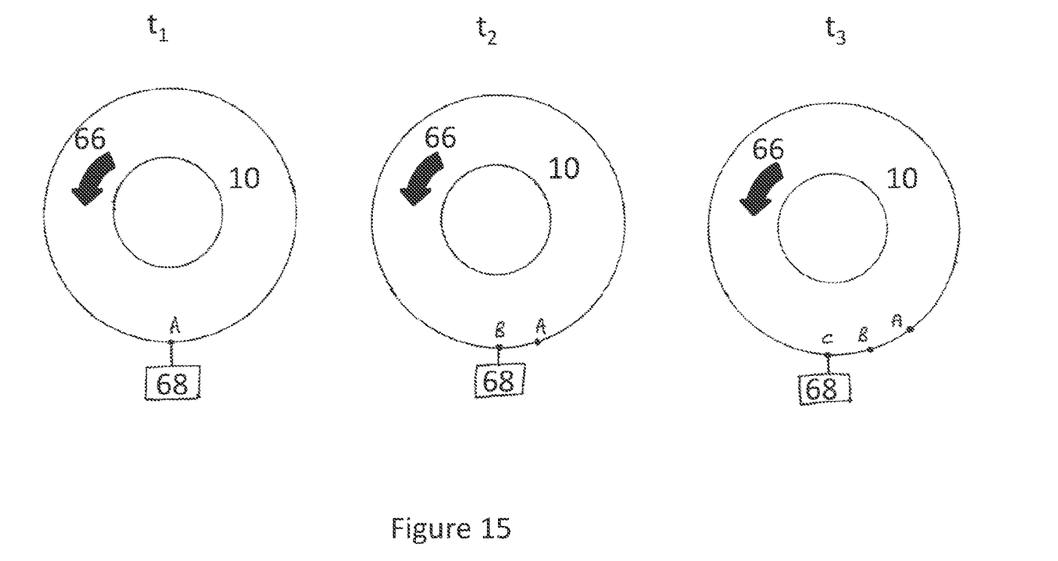
FIG. 15 shows an alternative embodiment in accordance with the invention, wherein a tyre is mounted on a rolling road.

FIG. 15 shows an alternative embodiment in which tread depth measurement data is obtained using a rolling road. The vehicle is stationary while the tyre on the vehicle rotates. The vehicle is omitted for clarity. FIG. 15 shows a tyre at three different times, $t_1$, $t_2$, and $t_3$, where $t_1$ is the earliest time and $t_3$ is the latest time. The tread depth measurement apparatus 68 is used to project a laser pattern onto the tyre surface and to image the regions of the tyre surface where the laser pattern is incident as the tyre rotates in the manner previously described. At time $t_1$, the tread depth measurement device 68 images a region A on the tyre surface. Like in the embodiments shown in FIGS. 1-3, the laser pattern projected onto the tyre and imaged by the tread depth measurement device 68 is a line extending in a direction from sidewall to sidewall of the tyre. As time elapses, the wheel 10 rotates. At time $t_2$, a new region B has moved into view of the tread depth measurement device 68. The laser pattern is projected onto region B and is imaged by the tread depth measurement device 68. As time elapses further, the tyre rotates to bring a third region C into view of the tread depth measurement device 68 at time $t_3$. The laser pattern is projected onto region C and is imaged by the tread depth measurement device 68.

A movement profile is then obtained for the tyre based on the speed of rotation of the tyre and the frame rate of the tread depth measurement device 68.

The tread depth data obtained by the tread depth measurement device 68 is then mapped onto a base tyre structure, using the frame rate and speed of rotation to relate the time at which each region was imaged to the position of that region on the tyre surface.

Figure 16:
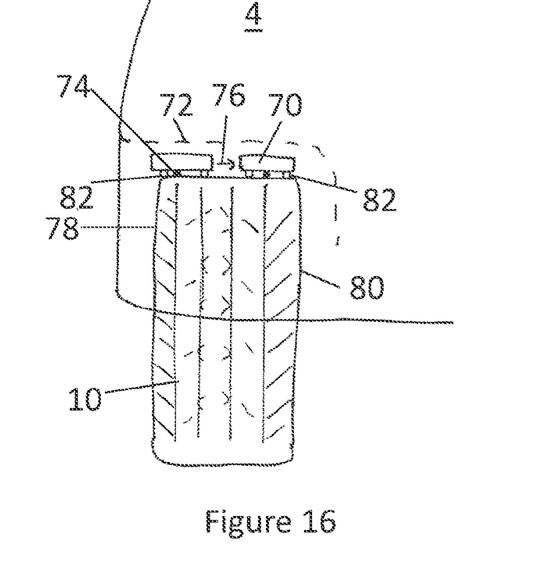
FIG. 16 shows a further alternative embodiment, wherein a handheld tread depth measurement device is used to obtain tread depth data and a movement profile for a tyre in situ on a stationary vehicle.

FIG. 16 shows an alternative embodiment for obtaining tread depth data to produce a three-dimensional topological surface representation in accordance with the invention. FIG. 16 shows a front view of the tyre 10 when it is mounted in the vehicle 4. Dotted line 72 indicates the vehicle's wheel arch. The handheld tread depth measurement device 70 generates a laser beam 74 to produce an elongate pattern on the tyre surface in use. The handheld device 70 is moved in the direction of the arrow 76 across the surface of the tyre 10 from one sidewall 78 to the other sidewall 80. The handheld device 70 comprises guide wheels 82 and a rotary encoder (not shown) which is used to relate the distance travelled over the surface of the tyre to the time at which a tread depth measurement scan is obtained using the handheld device 70.

The movement profile is then determined from the movement of the handheld device 70 as calculated from the signal generated by the rotary encoder. This enables the generation of a three dimensional topological surface representation corresponding to a strip of tyre surface extending from one sidewall 78 to the other sidewall 80.

Figure 17:
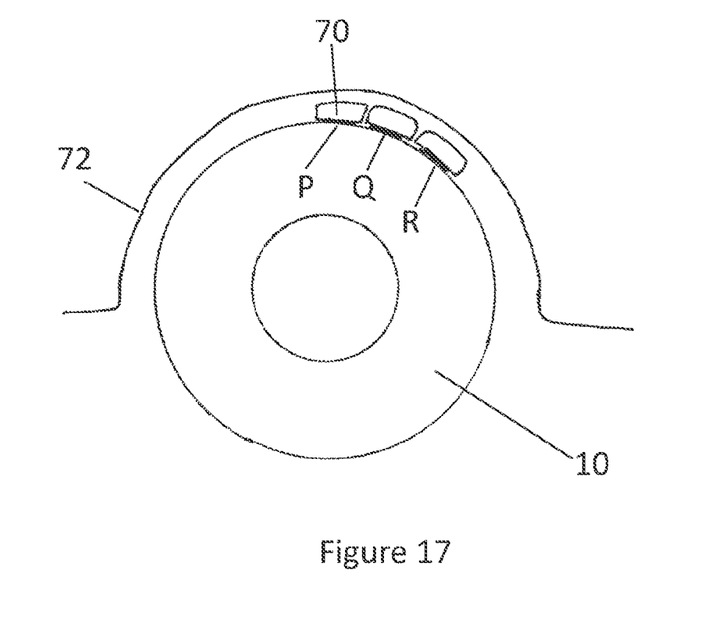
FIG. 17 shows the handheld device of FIG. 16 in multiple positions around a tyre to allow a larger segment of the tyre to be analysed.

FIG. 17 shows how the handheld device 70 can be moved to different positions on the circumference of the tyre 10 to repeat the process described with respect to FIG. 16. Three possible positions P, Q and R are shown in FIG. 17. It will be appreciated that the process can be repeated for fewer or more positions, for example enough to cover the top half of the tyre surface.

A three-dimensional topological surface representation for a region of the tyre surface corresponding to each position P, Q and R is obtained using the movement profile determined using the rotary encoder signal, as described above. These representations are then stitched together to create a complete scan of a larger region of the tyre.

The curvature of the base tyre structure onto which these sections are mapped may be determined using feedback from an accelerometer in the handheld device 70. For example, the accelerometer can be used to determine if the handheld device 70 is angled due to the circumferential curvature of the tyre (e.g. at position R, the hand-held device 70 is at a greater angle to the horizontal than at position Q). The accelerometer can also be used to determine if there is curvature between the sidewalls of the tyre, e.g. at the tyre shoulders, and this may be incorporated into the movement profile when each three dimensional topological surface representation is being generated. The three dimensional topological surface representations are then mapped onto the base tyre structure to produce a three-dimensional topological surface representation for a larger portion of the tyre 10.

The invention claimed is:

1. A method of generating a three-dimensional topological surface representation of a tyre on a vehicle, the method comprising:
   using a measurement device comprising a sensor to record tyre surface data for a tyre surface during a relative movement between the measurement device and the tyre surface;
   generating a movement profile; and
   mapping the tyre surface data from the sensor onto a base tyre structure, wherein the base tyre structure has a curvature corresponding to a tyre curvature of the tyre on the vehicle, and wherein mapping the tyre surface data onto the base tyre structure comprises using the movement profile to relate respective times at which the tyre surface data were recorded to corresponding respective positions on the base tyre structure and assembling the tyre surface data into said corresponding respective positions on the base tyre structure to construct the three-dimensional topological surface representation of the tyre.

2. The method as claimed in claim 1, comprising recording the tyre surface data as the vehicle moves towards or away from the measurement device.

3. The method as claimed in claim 1, wherein the movement profile comprises or is derived from a trace defined by a set of data representing the positions at given times traced by a part of the tyre surface as the relative movement takes place.

4. The method as claimed in claim 3, comprising discarding portions of the trace corresponding to one of more of: tread grooves, sipes, and tyre shoulders.

5. The method as claimed in claim 3, comprising one or more of: filtering noise from the trace; smoothing the trace; and using spline interpolation to remove discontinuities in the trace.

6. The method as claimed in claim 3, comprising obtaining a plurality of traces, each corresponding to a respective position on the tyre surface.

7. The method as claimed in claim 6, comprising extrapolating one or more traces corresponding to respective positions on the tyre surface to extend said one or more traces to a length that is the same as a length of a further trace corresponding to a further position on the tyre surface.

8. The method as claimed in claim 6, comprising discarding any trace that shows more than a defined variation from a median of the other traces of the plurality of traces.

9. The method as claimed in claim 6, comprising taking an average of the plurality of traces to obtain a movement profile comprising a single trace.

10. The method as claimed in claim 1, comprising recording tyre surface data as the tyre turns relative to the measurement device while the vehicle is stationary.

11. The method as claimed in claim 10, wherein the movement profile is determined from a rotation speed of the tyre.

12. The method as claimed in claim 10, wherein the three-dimensional topological surface representation is generated by mapping the tyre surface data onto the base tyre structure based on a frame rate of the measurement device.

13. The method as claimed in claim 1, wherein the tyre surface data is obtained using a handheld device.

14. The method as claimed in claim 13, wherein the device is adapted to generate a movement profile by measuring movement of the device relative to the tyre.

15. The method as claimed in claim 13, wherein the handheld device comprises an accelerometer.

16. The method as claimed in claim 15, comprising using feedback from the accelerometer to determine the curvature of the tyre.

17. The method as claimed in claim 1, further comprising correcting for an angle of a scan relative to an axis of the tyre.

18. The method as claimed in claim 1, further comprising improving the generated three-dimensional topological surface representation using one or more of a combination of spatial low pass filters and a bilateral filter for preserving edges of the tyre.

19. The method as claimed in claim 1, wherein the measurement device is a tread depth measurement device, and the tyre surface data is tread depth data.

20. The method as claimed in claim 19, wherein the tread depth measurement device comprises an optical sensor.

21. The method as claimed in claim 1, wherein the measurement device is arranged to use a sensing arrangement both for determining a distance to the tyre surface and for measuring the tyre surface.

22. An apparatus for generating a three-dimensional topological surface representation of a tyre on a vehicle, the apparatus comprising:
   a measurement device comprising a sensor arranged to record tyre surface data for a tyre surface during a relative movement between the measurement device and the tyre surface;
   wherein the apparatus comprises a processing system configured:
      to generate a movement profile; and
      to map the tyre surface data from the sensor onto a base tyre structure, wherein the base tyre structure has a curvature corresponding to a tyre curvature of the tyre on the vehicle, and wherein the processing system is configured to use the movement profile to relate respective times at which the tyre surface data were recorded to corresponding respective positions on the base tyre structure and to assemble the tyre surface data into said corresponding respective positions on the base tyre structure to construct the three-dimensional topological surface representation of the tyre.

* * * * *